United States Patent [19]
Hiraoka et al.

[11] 3,882,008
[45] May 6, 1975

[54] WATER-SOLUBLE AND/OR WATER-DISPERSIBLE COATING MATERIAL AND COMPOSITION

[75] Inventors: Michio Hiraoka, Tokyo; Hisao Nakada, Niigate, both of Japan

[73] Assignee: Nippon Soda Kabushiki Kaisha, Tokyo-to, Japan

[22] Filed: Mar. 11, 1971

[21] Appl. No.: 123,406

Related U.S. Application Data
[62] Division of Ser. No. 668,202, Sept. 15, 1967, abandoned.

[30] Foreign Application Priority Data
Sept. 20, 1966 Japan............................. 41-61666

[52] U.S. Cl. .............................................. 204/181
[51] Int. Cl. .................................................. B01k 5/02
[58] Field of Search ..................................... 204/181

[56] References Cited
OTHER PUBLICATIONS
Fink et al., Transactions of the Electrochemical Society, Vol. 94 (1948) pages 312 & 324.

*Primary Examiner*—Howard S. Williams
*Attorney, Agent, or Firm*—Nolte and Nolte

[57] ABSTRACT

Alkali metal, ammonium or organic ammonium butadiene homo- or copolymer carboxylate, wherein number average molecular weight is in a range of 200 to 10,000, butadiene unit in the polymeric chain is more than 50 weight percent, 1,2-butadiene bonding in the butadiene unit is more than 80 weight percent, is useful for a water-soluble and/or water -dispersible coating material and is used a composition such as water-soluble, aqueous emulsion and electro-deposition paint and varnish, cured coating film of which has superior properties such as film hardness, abrasion resistance, bending resistance, adhesion, chemical resistance, solvent proof, weathering resistance, surface flatness and coulombic yield.

7 Claims, No Drawings

WATER-SOLUBLE AND/OR WATER-DISPERSIBLE COATING MATERIAL AND COMPOSITION

This is a division of application Ser. No. 668,202, filed Sept. 15, 1967, now abandoned.

The present invention relates to a novel water-soluble and water-dispersible coating material of a homopolymer of butadiene, a copolymer consisting of 50 weight percent or more of butadiene unit or a mixture thereof having carboxylate, carboxyl and/or alkoxy carbonyl groups on at least one end of polymeric chain. More particularly, this invention relates to water-soluble emulsion and/or electrodeposition paint and varnish made from said coating material.

The first object of this invention is to provide a coating material for water-soluble paint and varnish having a fast curing rate and superior natures and properties of cured film, e.g., hardness, abrasion resistance, bending resistance, adhesion chemical resistance, solvent proof, weathering resistance and surface flatness. The second object is to provide a coating material for electrodeposition paint and varnish having said superior natures. Further, the third object is to provide a coating material for aqueous emulsion paint and varnish having said superior natures.

It is well known that water paint and varnish of water soluble type and an aqueous emulsion type have poisonless and inflammable natures and are cheap compared with a paint and varnish of organic solvent type. Furthermore, in recent years, electrodeposition technique for painting or varnishing has come to develope, and flat and homogeneous coating films have come to be easily, safely and economically obtained, so the water paint and varnish become of great importance.

As the coating materials for the above water paint and varnish, natural drying oils introduced by hydrophilic group such as carboxyl, hydroxyl, ether, amino or sulfonic acid group are generally used, and further alkyd, aminoalkyd, amino, phenol or acrylate resin also employed. For example, as a process for the production of water-soluble and water-dispersible coating material from said drying oils, the process comprising an addition reaction of maleic anhydride to said oils and a subsequent neutralization with basic material has been known. And the products of the addition reaction are well known as maleic oil.

Other types of resin such as water soluble alkyd or amino-alkyd resins, which are prepared to have somewhat higher acid value, however fundamental structures of which are similar to usual alkyd or amino-alkyd resins for the vehicle of solvent type paint and varnish, furthermore residual carboxyl groups of which are neutralized with ammonia or amine, have also been used widely as coating material of water soluble type or electrodeposition type.

However, the known water-soluble or water-dispersible coating material such as maleic oil has numerous faults and drawbacks in nature of coating film originated in properties of raw materials. Further, in case of alkyd resins or aminoalkyd resins in water soluble type, polymerization reaction shall be necessarily interruped in a producing step, in order to keep a high acid value of the product. Therefore, optional control for molecular weight of product resins becomes difficult and distribution of molecular weight becomes broad. So, the coating films coated by said resins and then cured are inferior in hardness, abrasion resistance, bending resistance and adhesion, and in case of using those resins for electrodeposition coating, the throwing power is decreased by the broad distribution of melecular weight.

On the other hand, the employment of a polybutadiene series as a coating materials is proposed. Generally, polybutadiene series comprising homopolymer and copolymer of butadiene may be classified to two kinds by the structure of polymeric chain, and one of which consists mainly of 1,4-bonding of butadiene and scantily of 1,2-bonding, and another consists mainly of 1,2-bonding. The former includes polybutadienes, butadiene-styrene copolymers and butadiene-acrylonitrile copolymers polymerized in the presence of radical catalyst; polybutadienes and butadiene-styrene copolymers polymerized in the presence of sodium, lithium or organo-lithium catalyst in a hydrocarbon solvent; and stereo-regular polybutadienes polymerized in the presence of coordinated anionic catalyst. The latter, however, is only homopolymers and copolymers of butadiene prepared by anionic polymerization using alkali metal catalyst in the presence of Lewis base solvent, and coating films of which are very superior compared with others.

The minute investigation was carried out based on the consideration that a series of polybutadiene consisting mainly of 1,2-bonding, which has the above superior properties for coating film, could be used for a excellent vehicle of water paint and varnish, if it is possible to make the polymer into water soluble or dispersible type.

As the result of the investigation, it was disclosed that monocaboxylic acid dicarboxylic acid or a mixture thereof prepared by introducing carboxyl group to one or both ends of polymeric chain of butadiene homopolymer or copolymer, having 50 weight percent or more of butadiene unit, consisting mainly of 1,2-bonding and a mixture thereof become to water soluble or dispersible depending mainly on the content of carboxy anion and average number of carboxy anion attached on a polymeric chain and some upon the contents of carboxyl and alkoxycabonyl group. Those derivatives of said polybutadiene series are successfully employed for the coating materials of water-soluble, electrodeposition, and/or emulsion paint and varnish. It has been, further, found that those paint and varnish have a fast drying rate and very superior natures and properties of cured film such as hardness, abrasion resistance, bending resistance, adhesion, chemical resistance, solvent proof, weathering resistance, surface flatness and gloss.

The series of polybutadiene dicarboxylic acid consisting mainly of 1,2-bonding in the present invention are prepared as follows:

In the presence or absence of aromatic hydrocarbon activator such as naphthalene or 1,2-diphenylbenzene, butadiene or a mixture of butadiene and diluent is added into a mixture of Lewis base such as tetrahydrofuran, and alkali metal, such as Lithium and sodium, and the resulting reaction mixture is treated with carbon dioxide to obtain butadiene homopolymer dicarboxylic acid having carboxylic group on both ends of polymeric chain (hereinafter referred as [A]). If butadiene and a comonomer, such as isoprene or styrene, or a mixture of the said comonomer and diluent are added simultaneously or successively into the above mixture and the resulting reaction mixture is treated with carbon dioxide to produce butadiene copolymer dicarboxylic acid having carboxylic group on both ends of polymeric chain (hereinafter referred as [B]).

The said series of polybutadiene dicarboxylic acid [A] and [B] have number average molecular weight of 200 to 10,000, and 80 to 90 percent or more of the butadiene unit in the polymeric chain thereof consists of 1,2-bonding. The viscosity varies by molecular weight or structure of the polymer, e.g. polymer [A] having number average molecular weight of 1,000 shows about 151 poise at 45°C and polymer [A] having number average molecular weight of 5,000 shows above 4,500 poise at 45°C.

Carboxylic equivalent also varies by molecular weight of the polymer, e.g. polymer [A] or [B] having number average molecular weight of 1,000 shows approximately 500 to 700, and polymer [A] or [B] having number average molecular weight of 3,000 shows approximately 1,500 to 2,200.

Result of infrared analysis shows that butadiene unit structure of [A] and [B] consists mainly of 1,2-bonding, and infrared absorptions caused by carboxyl group are observed apparently.

From the polymers [A] and [B] thus prepared, excellent coating materials for water soluble, electrodeposition and/or emulsion paint and varnish are easily obtained by means of subsequent chemical treatment such as partial esterification and partial or entire neutralization. The content and the sort of carboxylate group such as alkali metal, ammonium or amine carboxylate in polymer is very important in relation to its water-solubility and water dispersibilty, and the content ratio of carboxy anion in the polymer, which is measured as carboxylic equivalent, should be less than 5,000. The partial esterification is applied to produce a coating material preferred to emulsion paint and varnish from a polymer having low carboxylic equivalent according to adjusting the polarity of the polymer or polymer carboxylate. However, the esterification is unfavorable from the economical view point. As the ester, usually, alkyl ester such as methyl, ethyl, propyl, butyl, hexyl, octyl, dodecyl stearyl, hydroxyethyl and hydroxypropyl ester is employed. As the process for the esterification is employed a usual method comprising the esterification of alkali metal carboxylate of polymer, which is easily obtained by the introduction of carbon dioxide into the polymerization mixture containing alkali metal polymer dianion, with usual esterification agent such as dialkyl sulfate and alkyl toluenesulfonate.

A water soluble paint and varnish in this invention is prepared as follows:

Said polymer [A], [B] or a mixture thereof, if necessary after a drier and/or a hydrophilic solvent are added to it and the resultant mixture is homogenized, is neutalized with a water solution of base stoichiometrically equivalent or less to the equivalent of carboxyl group. If desired water is added to the mixture to adjust viscosity, and thereby an water-soluble transparent varnish is obtained.

On the other hand, to said polymer [A], [B] or a mixture thereof, a pigment, and if necessary a drier, are added and the resultant mixture is kneaded by an appropriate apparatus such as roller mixer and then the above neutralization and dilution with water are carried out, and thereby an water soluble colored paint is obtained.

The drier used in the water-soluble paint and varnish of this invention is a drier widely employing for accelerating the drying of a drying oil. Metal oxides such as manganese dioxide and cobalt oxide; metal carboxylates such as metal stearates, metal oleates, metal linolenates, metal octenates, metal naphthenotes and metal rosinates, in which metal is a transition metal such as Ti, V, Cr, Fe, Co, Ni, Cu, Zn, Mo, Cd and W; and organic peroxides such as benzoyl peroxide, dicumylperoxide and methylethylketone peroxide are included in it.

Hydrophilic solvent in the water-soluble paint and varnish of this invention comprises primary alcohols such as methanol, ethanol and n-buthanol; secondary alcohols such as isopropanol and secondary-buthanol; tertiary alcohols such as tertiary buthanol; alcohols containing ether bonding such as methoxy ethanol, ethoxyethanol, butoxyethanol and diethylene glycol monomethyl ether; ethers such as dimethoxyethane, tetrahydrofuran and 1,4-dioxane; ketones such as acetone, methylethylketone and cyclohexanone; and esters such as ethyl formate, methyl acetate, ethyl acetate, isopropyl acetate and butyl acetate. In order that a quality of cured film is improved and non-flammability and non-conbustibility of water soluble paint is not impaired, a solvent having somewhat higher boiling point in the above solvent is selectively used and its use is preferably controlled as a small amount.

Base used for neutralization in the process of this invention comprises inorganic alkali such as caustic soda, caustic potash and aqueous ammonia; primary amines such as ethyl amine and cyclohexylamine; secondary amines such as dimethyl amine, diethylamine and morpholin; tertiary amines such as trimethyl amine, triethyl amine and N-methyl morpholin; polyamines such as ethylene diamine and alkonol-amines such as ethanol amine, diethanol amine, triethanol amine, dimethyl aminoethanol, diethylaminoethanol, 2-amino-2-methyl-1-propanol, 2-amino-2-methyl-1,3-propanediol, and tris(hydroxymethyl) amino methane. Those are commonly used in the range of 0.8 to 1.0 equivalent to carboxyl equivalent.

Pigments for color paints in this invention comprise widely employable pigments for general paints, e.g. inorganic pigment such as titanium white, zinc white, chromium oxide, ultramarine and red lead, and organic pigments such as nitroso series, nitro series, azo series and phthalocyanine series. Those pigments have a favorable wetting compatibility together with the coating material and they are stable in the water-soluble paint of this invention for a long storage.

An emulsion paint and varnish of the present invention is prepared as follows:

The polymer [A], [B] or a mixture thereof is treated in the presence of water and dispersing agent, if necessary together with a drying agent, to produce a stabilized emulsion varnish of oil in water type or water in oil type, which is to form a transparent coating film after coating and curing.

The emulsion may be mixed with a pigment dispered in water, and a colored emulsion paint is obtained.

Drier and pigment for the emulsion paint are similar to those mentioned for the water soluble paint, however, a drier soluble into said coating material and a hydrophilic pigment are more favorably used.

Dispersing agent used in the emulsion paint and varnish of this invention is the common ones widely used in for a usual emulsion paint and it involves anionic surfactant such as alkali metal and amine salt of fatty acid, nonionic surfactant such as polyoxyethylene alkylphenol ether and high molecular materials for protective colloid such as polyvinylalcohol and carboxymethyl cellulose.

A preferable amount of water for preparing emulsion is an amount equal to or more than the amount of the coating material.

In the emulsifying process, a blade agitator, a high-speed rotary homogenizer, and a supersonic homogenizer are used. Average diameter of dispersion particles in emulsion is apt to increase in accordance with the increase of molecular weight of the coating material and usually it is in the range of 0.1 to 10μ, and the emulsion has a very superior stability for long period. When the emulsion paint or varnish is coated, water is evaporated and the dispersion particles are agglomerated to form a continuous film.

A paint and varnish for electrodeposition coating in the present invention is prepared as follows:

The polymer [A], [B] or a mixture thereof, if necessary hydrophilic solvent is added into it to dissolve, is neutralized with a base in equivalent or less amount to the carboxyl equivalent of the polymer or the mixture. Then, the solution is diluted with water to obtain an aqueous solution having a concentration of 5 to 20 weight percent.

A homogeneous coating film is formed by electrodeposition on an anode in a bath of the above solution. When pigments are suspended in the bath, a colored coating film is formed. A superior cured transparent or colored coating film is made easily by baking the electrodeposited anode.

The present invention is illustrated more particularly by the following non-limiting Examples.

EXAMPLE I.

Raw Material of Water-soluble and/or Water-dispersible Coating Material.

Sodium dispersion was added into a solution of 1,2-diphenylbenzene in tetrahydrofuran. Butadiene is added into the mixture to prepare the polymerization mixture. The said mixture was treated with carbon dioxide, whereby there was obtained butadiene homopolymer dicarboxylic acid [I] which indicated number average molecular weight of 1,035, carboxyl equivalent of 658, 87.9 percent of 1,2-bonding, 12.1 percent of 1,4-transbonding, and viscosity of 1,665 poise at 25°C. Similarly, there was prepared butadiene homopolymer dicarboxylic acid [II] which indicated number average molecular weight of 2,465, carboxyl equivalent of 1,548, 91 percent of 1,2-bonding, 9.0 percent of 1,4-transbonding and viscosity of 450 poise at 45°C. Cobalt naphthenate containing 0.05 weight part (hereinafter referred merely as part) of cobalt which was dissolved in one part of toluene, was added respectively into 100 parts of both polymers [I] and [II]. Further, 40 parts of toluene was added into the polymer [II] to decrease viscocity. Sample I and sample II thus obtained from each polymer [I] and [II] were coated respectively on glass plates in a thickness of 30μ by using an applicator. After drying at room temperature, glassy, flat and smooth cured films were obtained. The drying time is about 8 hours and about 4 hours for sample I and II respectively. The result of hardness test by pencil scratching tester showed about 2H for sample I and about 3H for sample II. Example II Water-soluble Varnish As a drier, cobalt naphthenate containing 0.05 part of cobalt was added respectively into both 100 parts of butadiene homopolymer dicarboxylic acid [I] and [II] in Example I. Then, as a hydrophilic solvent, 40 parts and 60 parts of butoxyethanol were added into the mixtures respectively and both were dissolved homogeneously.

The former mixture was neutralized with 15.3 parts of triethylamine and the latter with 7.9 parts of 28 percent aqueous ammonia, and water soluble, milky-white and viscous matter were obtained respectively.

Sample III which was prepared from butadiene homopolymer dicarboxylic acid [I] was directly used for coating and sample IV which was prepared from butadiene homopolymer dicarboxylic acid [II] was diluted with 10 parts of water to use for coating (sample IV').

Both samples were coated respectively on glass plate by using an applicator as thick as 30μ.

Flat and smooth cured coating films having hardness of 2H were obtained respectively after drying at room temperature. The drying time is about 10 hours and 5 hours respectively for sample III and IV'.

On the other hand, slightly yellowish flat and smooth coating films having more than hardness 4H were obtained from both samples respectively after baking the uncured coated films at 140°C for 30 minutes.

EXAMPLE III

Water-soluble Paint

Sample V and sample VI were prepared by adding 20 parts of titanium oxide and 50 parts of water to sample III and sample IV' in Example II and mixed by rotary homogenizer. Titanium oxide was dispersed homogeneously in each sample, and no separation was observed after allowing to stand overnight.

Sample V and sample VI thus obtained were coated respectively on glass plates in a thickness of 50μ. After drying at room temperature, white, glassy and flat cured coating films having pencil hardness of 2H were obtained. The drying time is about 8 hours and about 6 hours for sample V and VI respectively. On the other hands, white and flat cured coating films having pencil hardness of 4H were obtained from both samples after baking the uncured coating films at 140°C for 30 minutes.

EXAMPLE IV

Emulsion Varnish

Polybutadiene homopolymer dicarboxylic acid [III], having number average molecular weight of 572, carboxyl equivalent of 357, 85 percent of 1,2-bonding, 15 percent of 1,4-trans-bonding and viscosity of 1,020 poise at 25°C was prepared according to the similar process in Example 1. 100 parts of said polymer [III] was neutralized with 29.4 parts of diethanolamine and 100 parts of water was added to the mixture and the resultant solution was treated with a supersonic homogenizer for 5 minutes to obtain an emulsion (sample VII). Dilution of the emulsion with an optional ratio of water could be carried out without separation to two layers. According to microscope observation, emulsified particle showed 2μ of maximum particle diameter, and 0.5μ of average particle diameter and the emulsion was type of oil in water.

The emulsion was coated on a glass plate and allowed to stand at room temperature for 2 hours for evaporating moisture and thereby a continuous film was obtained. After baking at 150°C for 30 minutes, slightly yellowish cured film was obtained.

EXAMPLE V

Emulsion Paint

Sample VIII was prepared by further adding 20 parts of zinc white into sample VII in Example IV in the homogenization process.

Sample VIII kept homogeneous white emulsion after allowing to stand one week at room temperature in a closed container, and dilution of the emulsion with an optional ratio of water could be carried out without separation to two layers.

The emulsion was coated on a glass plate and allowed to stand at room temperature for 2 hours for evaporating moisture and thereby a continuous white film was obtained. After baking at 150°C for 30 minutes, white and flat cured film was obtained.

[II], showed 10 weight percent of solid concentration and pH 7.5.

Electrodeposition experiment using sample IX and X were carried out as follows:

Sample IX and sample X were charged respectively in tin-plate containers having 1l inside capacity and kept at 30°C. Iron sheets (No. 144 treated product in accordance with JIS-G-3310) in the size of 5 × 15 × 0.08 cm, treated with zinc phosphate were immersed in the central part of container and were used as anode.

The containers were used as cathode and thereby electrodepositions were carried out respectively. After finishing the electrodepositions, the test pieces were washed with water, and allowed to stand at room temperature for about 20 minutes and baked at 140°C for 30 minites. As a comparison experiment, a commercial electrodeposition paint of aqueous soluble type, consisting of alkyd resin type was electrodeposited simultaneously. The results of electrodeposition experiments are shown in Table I.

Table I

| Experiment No. | Sample | Condition of electrodeposition | | | Result | | |
|---|---|---|---|---|---|---|---|
| | | Voltage (V) | Electric current (mA) | Time (min.) | Appearance after curing | Film thickness (mm) | Coulombic yield (mg/ coulomb) | Film hardness |
| 1 | IX | 10 | 350 to 20 | 2 | slightly yellowish, homogenous, flat and smooth film. | 25 | 8.8 | more than 4H |
| 2 | | 20 | 730 to 50 | do. | do. | 32 | 8.6 | do. |
| 3 | | 30 | 1050 to 60 | do. | do. | 40 | 9.6 | do. |
| 4 | X | 10 | 250 to 10 | 2 | slightly yellowish, homogeneous, flat and smooth film. | 10 | 7.5 | more than 4H |
| 5 | | 20 | 580 to 20 | do. | do. | 22 | 13.7 | do. |
| 6 | | 30 | 720 to 20 | do. | do. | 29 | 17.5 | do. |
| 7 | | 40 | 880 to 20 | do. | do. | 32 | 20.4 | do. |
| 8 | | 20 | 610 to 20 | 2 | slightly yellowish, homogeneous, flat and smooth film. | 9 | 11.7 | H to 2H |
| 9 | Contrast (alkyd resin) | 40 | 1300 to 30 | do. | do. | 20 | 11.5 | do. |

Note:
(1) Film hardnesses are shown by the H value measured by a pencil scratching tester.
(2) Bath temperature of electrodeposition was settled at 30°C.

EXAMPLE VI

Electrodeposition Varnish 40 parts and 60 parts butoxyethanol were added respectively to 100 parts of butadiene homopolymer dicarboxylic acid [I] and [II] in Example I, and those were dissolved completely. Then to the mixtures, 14.4 parts and 6.2 parts of diethanolamine were added respectively to be neutralized. Then, both neutralized solutions were diluted with water to 1,000 parts in total respectively.

Thus, an aqueous solutions, sample IX and sample X which were prepared respectively from polymer [I] and The results showed that both samples IX and X gave homogeneous, flat and, smooth and superiorly high hard films compared with that from the commercial electrodeposition paint, and further sample X was excellent as coulombic yield.

EXAMPLE VII

Electrodeposition Varnish

Relation between electrodeposition time and cured film thickness was investigated using electrodeposition varnish, sample X and same apparent as Example VI. The results are shown in Table 2.

Table 2

| Experiment No. | Sample | Condition of electrodeposition | | | Result | | | |
|---|---|---|---|---|---|---|---|---|
| | | Voltage (V) | Electric current (mA) | Time (min.) | Appearance after curing | Film thickness | Coulombic yield (mg/coulomb) | Film hardness |
| 10 |   | 40 | 850 to 25 | 1 | slightly yellowish, homogeneous, flat and smooth film. | 16 | 18.2 | more than 4H |
| 11 | X | 40 | 820 to 10 | 2 | do. | 26 | 19.1 | do. |
| 12 |   | 40 | 830 to 10 | 3 | do. | 32 | 18.5 | do. |
| 13 |   | 40 | 850 to 10 | 4 | do. | 34 | 15.8 | do. |
| 14 |   | 40 | 870 to 10 | 5 | do. | 35 | 19.0 | do. |

Note: Refer to "Note" in Table 1 for test conditions.

The results showed that a film thickness reached approximately saturated state by carrying out electrodeposition for 5 minutes.

EXAMPLE VIII

Electrodeposition Varnish

The throwing power of sample X in Example VI and VII was investigated in comparison with a commercial electrodeposition varnish of alkyd type. An iron sheet treated with zinc phosphate according to the same method as in Example VI having the size of 5 × 20 × 0.08 cm, which was bent along the center line passing through both center of long sides of the sheet to form a V shape with an angle of 30°, was employed as anode. The apex of the V shape was set to locate 1 cm distant from a plane cathode, and the whole body was immersed into a electrodeposition bath at a definite temperature and then the electrodeposition was carried out. The electrodeposited anode was baked under the condition in Example, VI, appearance and distribution of film thickness of inside surface of V shape anode were observed. The results are shown in Table 3.

The results in Table 3 indicate that sample X possesses equal throwing power or more compared with contrast sample.

EXAMPLE IX

Electrodeposition Varnish

Sodium dispersion was added to a solution of naphthalene in tetrahydofuran. To the mixture, 80 parts of butadiene was added and 20 parts of styrene as a comonomer was successively added, and the resultant mixture of polymerization reaction was treated with carbon dioxide and thereby there was prepared butadiene-styrene copolymer dicarboxylic acid [IV] having number average molecular weight of 956, carboxyl equivalent of 641 and viscosity of 1,520 poise at 25°C. 40 parts of butoxy ethanol was added into 100 parts of the copolymer [IV] and dissolved. Then, to the solution, 19.5 parts of 28 percent aqueous ammonia was added. The neutralized solution was diluted with water to 1,000 parts in total, sample XI. The electrodeposition tests were carried out by the same process as in Example VI and the results are shown in Table 4.

Table 3

| Experimental NO. | Sample | Condition of electrodeposition | | | Result | | | | |
|---|---|---|---|---|---|---|---|---|---|
| | | Voltage (V) | Electric current (mA) | Time (min.) | Appearance of coating film at the reverse surface | *1 Film thickness (mm) | *2 Film thickness (mm) | *3 Film thickness (mm) | coulombic yield (mg/coulomb) |
| 15 |   | 40 | 350 to 30 | 2 | Homogeneous, flat and smooth film | 17 | 17 | 20 | 14.2 |
| 16 | X | 60 | 580 to 50 | do. | do. | 23 | 25 | 23 | 19.2 |
| 17 |   | 40 | 750 to 40 | do. | do. | 17 | 17 | 20 | 13.0 |
| 18 | contrast (arkyd resin) | 60 | 1130 to 50 | do. | do. | 28 | 28 | 45 | 15.0 |

Note: (1) Refer to "Notes" in Table 1 for test conditions.
(2) *1: Film thickness at the center of inside corner line of V shape anode.
*2: Film thickness at the center of inside plain surface of one side of V shape anode.
*3: Film thickness at the center of inside edge line of the same side of V shape anode.

Table 4

| Experiment NO. | Sample | Condition of electrodeposition | | | Result | | | |
|---|---|---|---|---|---|---|---|---|
| | | Voltage (V) | Electric current (mA) | Time (min.) | Appearance after curing | Film thickness (mm) | Coulombic yield (mg/coulomb) | Film hardness |
| 19 |   | 10 | 400 to 15 | 2 | slightly yellowish, homogeneous, flat and smooth film. | 15 | 9.5 | 4H |
| 20 | XI | 20 | 760 to 20 | do. | do. | 21 | 10.8 | do. |
| 21 |   | 30 | 1100 to 25 | do. | do. | 28 | 12.5 | do. |

Note: Refer to "Notes" in Table 1 for test conditions.

The results showed that the electrodeposited films of sample XI have very superior properties as same as those of sample IX and X.

EXAMPLE X

Sample XII was prepared by adding 20 parts of titanium oxide into sample IX in Example VI in the dilution process. Electrodeposition was carried out in accordance with Example VI using sample XII under 30 V for 2 minutes and thereby washed with water, allowed to stand at room temperature for about 30 minutes and baked at 140°C for 30 minutes. Consequently, white and flat cured film having a thickness of 42μ and a pencil hardness of 4H was obtained. In this case, coulombic yield was calculated as 16.2 mg/coulomb.

What is claimed is:

1. A method of coating a substrate, comprising arranging the substrate as the anode of an electrolytic cell having an anode, a cathode and an electrolyte, the electrolyte comprising an aqueous solution or dispersion of a butadiene homopolymer or copolymer having at substantially each end of substantially each polymeric chain a carboxyl or carboxylate group and wherein number average molecular weight is in the range of 200 to 10,000, carboxylic equivalent is less than 5,000, butadiene unit in the polymeric chain is more than 50 weight percent, 1,2-butadiene bonding in the butadiene unit is more than 80 weight percent, at least 80% of the total of the carboxyl and carboxylate groups are carboxylate groups, and the carboxylate is alkali metal, ammonium or organic ammonium carboxylate and applying an electromotive potential across the cell whereupon the butadiene homopolymer or copolymer deposits on the anodic substrate.

2. A method according to claim 1, in which the carboxylate is alkanol ammonium carboxylate.

3. A method according to claim 1, in which the solution contains a hydrophilic solvent.

4. A method according to claim 3, in which the concentration of the homopolymer or copolymer in the solution is 5 to 20% by weight based on the weight of the solution.

5. A method according to claim 1, in which the polymer is a copolymer of butadiene and styrene or isoprene.

6. A method according to claim 1, in which the solution or dispersion contains as a drier a metal oxide, metal carboxylate or organic peroxide and the drier is deposited on the substrate with the homopolymer or copolymer.

7. A method according to claim 1, in which a pigment is suspended in the solution or dispersion and the pigment is deposited onto the substrate with the homopolymer or copolymer.

* * * * *